(12) United States Patent
Tsiberidis

(10) Patent No.: US 11,485,170 B2
(45) Date of Patent: **\*Nov. 1, 2022**

(54) ATTACHMENT FOR A VEHICLE WHEEL

(71) Applicant: GV Engineering GmbH, Heimsheim (DE)

(72) Inventor: Konstantin Tsiberidis, Untergruppenbach (DE)

(73) Assignee: GV Engineering GmbH, Heimsheim (DE)

( \* ) Notice: Subject to any disclaimer, the term of this patent is extended or adjusted under 35 U.S.C. 154(b) by 522 days.

This patent is subject to a terminal disclaimer.

(21) Appl. No.: 16/493,863

(22) PCT Filed: Mar. 13, 2018

(86) PCT No.: PCT/EP2018/056203
§ 371 (c)(1),
(2) Date: Sep. 13, 2019

(87) PCT Pub. No.: WO2018/167040
PCT Pub. Date: Sep. 20, 2018

(65) Prior Publication Data
US 2020/0247181 A1    Aug. 6, 2020

(30) Foreign Application Priority Data
Mar. 13, 2017  (DE) .......................... 102017105302.6

(51) Int. Cl.
*B60B 15/26*  (2006.01)

(52) U.S. Cl.
CPC ........ *B60B 15/26* (2013.01); *B60B 2900/212* (2013.01)

(58) Field of Classification Search
CPC .............................. B60B 15/26; B60B 15/263
See application file for complete search history.

(56) References Cited

U.S. PATENT DOCUMENTS

| 2009/0267404 | A1 | 10/2009 | Thompkins | |
| 2020/0086683 | A1* | 3/2020 | Tsiberidis | ............... B60B 15/26 |
| 2020/0164682 | A1* | 5/2020 | Tsiberidis | ............... B60B 19/00 |
| 2020/0223250 | A1* | 7/2020 | Tsiberidis | ............. B60B 15/263 |
| 2020/0223252 | A1* | 7/2020 | Tsiberidis | ............... B60B 15/26 |

FOREIGN PATENT DOCUMENTS

| DE | 1480751 A1 | 5/1969 |
| FR | 1043038 A | 11/1953 |
| GB | 857897 A | 1/1961 |
| WO | 8705866 A1 | 10/1987 |

OTHER PUBLICATIONS

German language International Search Report and Written Opinion, dated Sep. 10, 2018, 16 pages.

\* cited by examiner

*Primary Examiner* — Jason R Bellinger
(74) *Attorney, Agent, or Firm* — Barnes & Thornburg LLP

(57) ABSTRACT

An attachment for a vehicle wheel allows the vehicle to be driven when the tire is flat. The attachment includes a main body having a mounting portion and a running surface portion. When ready to be mounted, the mounting portion has a closed circumference.

18 Claims, 10 Drawing Sheets

ATTACHMENT FOR A VEHICLE WHEEL

CROSS REFERENCE TO RELATED APPLICATIONS

This is a national stage entry of International Patent Application No. PCT/EP2018/056203, filed Mar. 13, 2018, which claims the benefit of and priority to German Patent Application No. 10 2017 105 302.6, filed Mar. 13, 2017, the disclosures of which are both expressly incorporated herein by reference in their entireties.

DESCRIPTION

The present invention relates to an attachment for a vehicle wheel which allows the vehicle to be driven with a flat tire.

A vehicle wheel means a vehicle wheel of a motor vehicle. In the present case, axial direction means the direction of the axis of rotation of the vehicle wheel. The radial direction means the direction orthogonal to the axis of rotation of the vehicle wheel. The tire of the vehicle wheel is thus arranged radially outwards when seen from the rim of the vehicle wheel. The bolt circle of the vehicle wheel, for example, is located radially inwards. A circumferential direction means the circumferential direction of the vehicle wheel. An intact tire is thus closed in the circumferential direction.

The attachment according to the invention is configured with a base body which comprises a mounting portion and a tread portion, wherein the mounting portion is configured to be closed in the circumferential direction in the mounting state. The tread portion is formed with a gap in the circumferential direction in the mounting state. The tread portion comprises an insert portion which, when the attachment is in the state mounted on the vehicle wheel, is received in the gap in such a manner that the tread portion has a closed circular running surface.

The mounting state means a state in which the attachment is fitted to the vehicle wheel, that is to say the state which the attachment is in before it is finally fastened to the vehicle wheel but in which mounting can begin. For example, the mounting portion can be in multi-part form. When the mounting portion is then assembled, it is closed in the circumferential direction and mounting of the attachment on the vehicle wheel can begin. The mounting state thus means the state in which mounting on the vehicle wheel can begin.

In this mounting state, the tread portion has the gap in the circumferential direction. It is thereby possible to fasten the mounting portion and the tread portion to the vehicle wheel without removing the vehicle wheel from the vehicle or lifting the vehicle with a jack. To that end, the gap is simply oriented towards the ground and mounting is carried out.

When the mounting portion and the tread portion have been fastened to the vehicle wheel, the vehicle can be moved slightly. The gap then moves, as a result of the rotation of the wheel, away from the orientation towards the ground. For example, the vehicle can be moved forwards by half a turn of the vehicle wheel, the gap is then no longer oriented towards the ground but points upwards. The insert portion can then be inserted into or received in the gap. The attachment then has a closed circular running surface in the circumferential direction. Mounting of the attachment is then complete and the vehicle is ready to drive.

The base body is preferably in the form of a steel disk. However, other materials are also conceivable. The attachment according to the invention can be used as a compact alternative to a spare wheel.

It is advantageous if the insert portion is detachable from the tread portion and/or pivotably or displaceably connected to the tread portion. The insert portion can thus be configured, for example, to be simply removable or capable of being detachably connected to the tread portion. The insert portion can be connected or capable of being connected to the tread portion via a detachable or non-detachable pivot joint. Or can be configured or fastened in a displaceable manner (detachably or non-detachably) relative to the tread portion.

Advantageously, the gap extends at least over $\frac{1}{8}$, preferably at least over $\frac{1}{6}$, preferably at least over $\frac{1}{4}$, of the circumferential extent of the tread portion. It is thus ensured that there is sufficient free space to fasten the attachment to the vehicle wheel without having to remove the vehicle wheel or lift the vehicle by means of a jack.

It is also preferred if the gap extends over not more than half, preferably over not more than $\frac{1}{3}$, of the circumferential extent of the tread portion. By simply turning the wheel, the gap can thereby be moved away from the ground so that the insert portion can be received in or inserted, folded or pushed into the tread portion in a simple manner.

It is also preferred if the tread portion is integrally formed with the mounting portion. The attachment as a whole is thus particularly robust and easy to handle.

It is also preferred if the tread portion is detachable from the mounting portion. The attachment is thus easily stowable and can be stored particularly compactly.

It is also preferred if the mounting portion can be taken apart or folded. Compact storage of the attachment, for example in the glove compartment of a vehicle, is thus possible.

It is also preferred if the mounting portion is rigid and cannot be taken apart. The attachment is thus particularly easy to handle and it has great stability.

It is also preferred if the mounting portion has a positioning device for positioning the attachment on a rim of the vehicle wheel. The attachment can thereby be positioned in a centered manner on the vehicle wheel in a simple manner, whereby further fastening is made possible in a simple manner.

It is also preferred if the mounting portion has a fastening device for fastening the attachment to the rim of the vehicle wheel. Via the fastening device just mentioned, the positioned attachment can be fastened completely.

It is also preferred if the fastening device can be actuated independently of the positioning device. For fitting the attachment to the vehicle wheel, the attachment is first positioned on the vehicle wheel in the intended position via the positioning device. However, positioning via the positioning device is not sufficient to ensure driving operation but serves merely to correctly place the attachment on the vehicle wheel. Once the attachment has been positioned in the desired position on the vehicle wheel via the positioning device, the attachment is then firmly connected, preferably clamped, to the vehicle wheel via the fastening device. The positioning device advantageously remains unclamped relative to the rim of the vehicle wheel, even when the attachment has finally been fastened to the vehicle wheel. The positioning device is so configured that it permits a centered arrangement of the attachment on the vehicle wheel, wherein the fastening device can be actuated independently of the positioning device, wherein, by actuating the fastening device, the attachment can be firmly fastened, preferably clamped, to the vehicle wheel. It is also preferred if at least the tread portion, and preferably also the mounting portion, has a rim-side part and a part remote from the rim which is detachable from the rim-side part, wherein the rim-side part and the part remote from the rim of the tread portion form in the assembled state a receiving portion in which a tread body is held in an interlocking manner, in particular via interlocking engagement. A tread body can thereby be securely fastened to the attachment.

Preferably, the tread body is formed of an elastic rubber material or polymer material. The interlocking holding, or the interlocking engagement, of the tread body can be achieved by a dovetail-shaped channel which is formed between the two parts, wherein the tread body has a corresponding portion having a complementary shape to that channel, which can be received in an interlocking manner in the channel.

It is also advantageous if the tread body is in shock-absorbing form, preferably wherein the tread body is formed of an elastically resilient material and/or has an elastically resilient structure, in particular a structure comprising voids and/or holes. The tread body can thus cushion unevenness of the driving surface. However, an air-filled tread body similar to a tire is also conceivable. A tread body of a polymer material with openings running substantially in the axial direction, which lead to an elastically damping property of the tread body, is conceivable. However, other structures of the tread body which lead to the resilient properties are also conceivable, in particular voids, which can be closed or open, in the tread body are conceivable for this purpose.

It can be advantageous if the base body has openings. These openings can serve on the one hand to reduce the weight of the base body and thus of the attachment. On the other hand, these openings can serve to make the attachment easily foldable or collapsible. In the folded or collapsed state, preferably at least one element protruding from the surface of the base body, such as, for example, the fastening device or part of the fastening device, can project into such an opening.

It is also preferred if the fastening device comprises at least one detachable fastening means, optionally a plurality of detachable fastening means. The fastening means can to that end be detachably fastened or capable of being detachably fastened to a holding lug of the fastening device, for example. Such a detachable fastening can be achieved, for example, via a screw connection.

It is also advantageous if the fastening device is so configured that the detachable fastening means in at least two positions which are arranged offset relative to one another in the radial direction can be connected to the mounting portion in two positions which are each adapted to a specific rim diameter. For example, the fastening device can for that purpose comprise at least two holding lugs which are arranged offset relative to one another in the radial direction, so that, according to the rim diameter of the vehicle wheel to which the attachment is to be attached, the fastening means can then be fastened via the corresponding holding lug and thus connected to the base body or the mounting portion thereof. The same attachment can thus be used, for example, for 17 inch and 18 inch rims.

It is also preferred if the fastening device comprises a coupling mechanism which couples a movement of at least two movable fastening means, preferably of all the movable fastening means, on actuation, preferably clamping, of the fastening device in the radial direction and/or in the axial direction, preferably wherein the coupling mechanism is so configured that the movement of the coupled movable fastening means is uniform. Uniform and centering clamping of the mounting portion thus always takes place on fastening.

It is also preferred if the fastening device, preferably at least one of the fastening means, preferably a plurality, in particular all, of the fastening means comprise a hook portion which is configured to engage behind a portion, in particular a rim flange, of the rim of the vehicle wheel. Thereby a particularly secure fastening is possible.

It is also preferred if the fastening device is so configured that, when the mounting portion has been fastened to the vehicle wheel, the fastening device contacts the rim, in particular the rim flange, over at least a sixth, preferably a quarter, preferably a third, preferably half, of its circumferential extent, in particular via contact portions which are preferably arranged on the fastening means. The force applied for fastening is thereby distributed over as large an area as possible and the risk of damage to the rim is minimized.

It is also preferred if the fastening device is so configured that the mounting portion, on fastening and clamping to the rim of the vehicle wheel, is urged in the axial direction towards the rim. This ensures particularly secure fastening to the rim. It is also preferred if the fastening device comprises a clamping surface which, when seen in the axial direction, slopes radially inwards, preferably in a linear or arcuate manner, wherein the fastening device is so configured that the clamping surface, on fastening and clamping of the attachment to the rim, moves, in particular is displaced, radially inwards, and the clamping surface is so configured that the mounting portion, on fastening and clamping to the rim of the vehicle wheel, is urged in the axial direction towards the rim. The attachment thus almost clamps itself when the actuating device is tightened against the rim, when the actuating device is actuated.

The fastening device can also be so configured that the attachment can be fastened in the region of the bolt circle of the original wheel. For example, the original screws of the vehicle wheel can to that end be replaced by screws having an internal thread, so that the attachment can be screwed into that internal thread, or the original screws of the vehicle wheel can be replaced by special screws via which both the attachment and the original wheel can be fastened.

In vehicle wheels having a center lock, this can be removed and replaced by a suitable fastening instrument, for example a threaded sleeve. The attachment can be fastened in the threaded sleeve. However, an embodiment is preferred in which the base body is substantially in the form of a circular disk and, when seen in the axial direction, substantially covers the contour of the tire, and preferably of the rim well, when the attachment has been fastened to the vehicle wheel.

Also within the meaning of the present invention is an attachment for a vehicle wheel for enabling driving operation with limited tire function, having a base body and a fastening device for fastening the attachment to the rim of the vehicle wheel, wherein the base body, when seen in an axial direction A, is circular or largely annular in shape, wherein the attachment has a clamping attachment for the fastening device which is configured to be fastened to the attachment radially externally around the fastening device and, in the fastened state, to contact the driving surface in such a manner that a catch mechanism of the clamping attachment is so clamped that it exerts pressure radially inwardly on the fastening device.

To that end, the clamping attachment has, for example, a catch mechanism which allows clamping radially inwards but prevents that clamping from being loosened radially outwards.

To that end, the latching mechanism can have a spring-biased engagement element which can engage into a pressing element having corresponding recesses. This engagement takes place in such a manner that the pressing element is freely movable radially inwards. With a corresponding loosening tool, the engagement element can be withdrawn, so that the pressing element can also be moved radially outwards and the attachment can be detached from the vehicle wheel. Other forms of the catch mechanism are conceivable, it is important that the catch mechanism is able to freely exert pressure radially inwards on the fastening device or fastening means and is prevented from being released or moving radially outwards. Or release or movement takes place only once the catch mechanism has been loosened, preferably via a corresponding tool.

Further features, possible applications and advantages of the invention will become apparent from the following description of exemplary embodiments of the invention, which are explained with reference to the drawing, wherein the features can be fundamental to the invention both in isolation and in different combinations, without explicit reference being made thereto again.

DETAILED DESCRIPTION

Figure 1B:
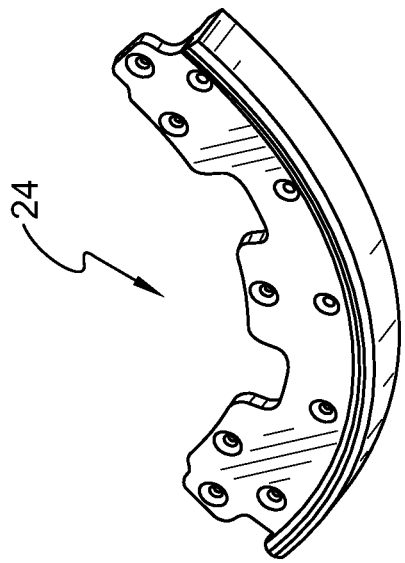
FIGS. 1A and 1B show a first embodiment of an attachment according to the invention in the mounting state.

In the following figures, corresponding components and elements carry the same reference numerals. For the sake of clarity, not all reference numerals are repeated in all figures.

Figure 1A:
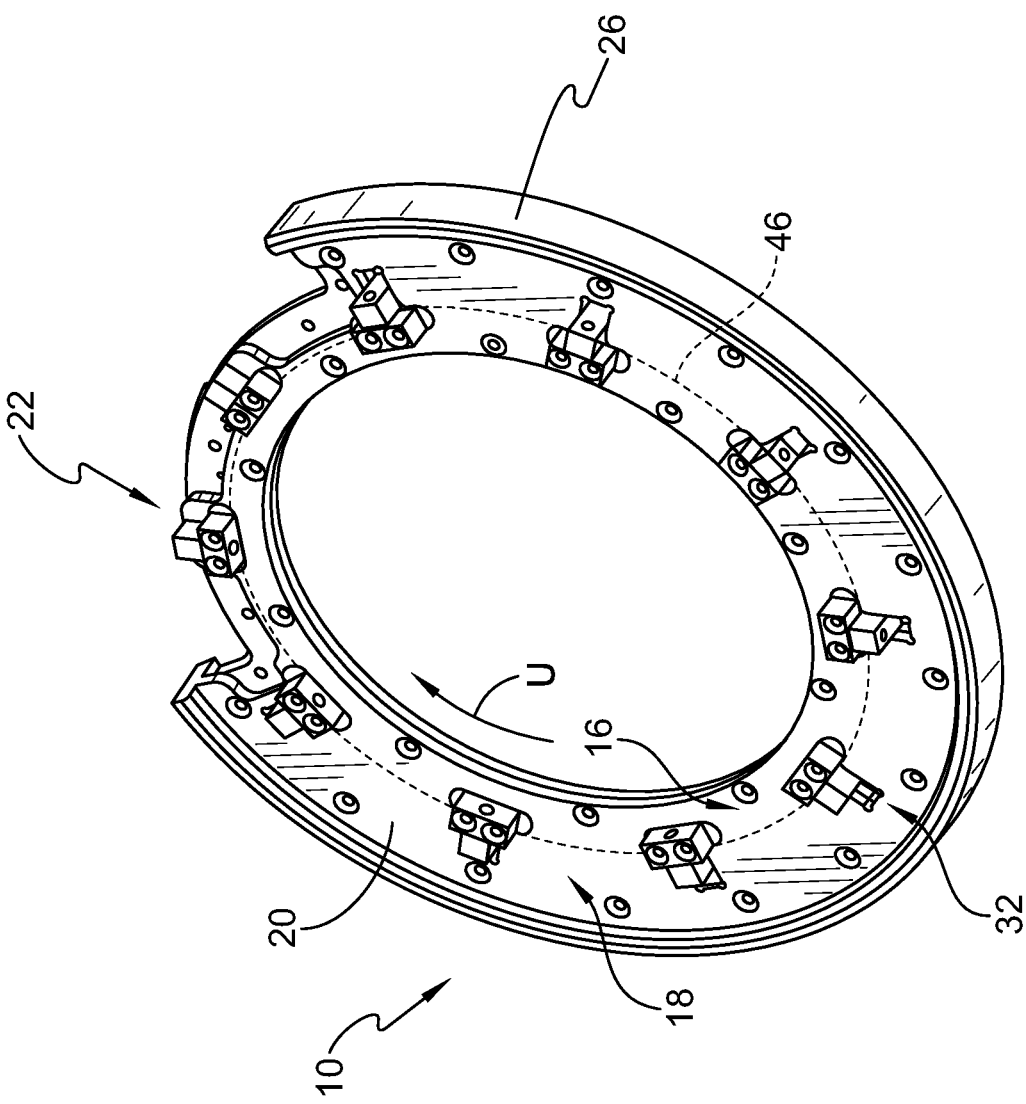

FIGS. 1A and 1B show, in a schematic representation, an attachment 10 for a vehicle wheel 12, not shown in FIGS. 1A and 1B, having a rim 13 which allows the vehicle to be driven with a flat tire 14.

The attachment 10 comprises a mounting portion 16 and a tread portion 18. The mounting portion 16 and the tread portion 18 are part of a base body 20 of the attachment 10.

The mounting portion 16 in the mounting state is closed in the circumferential direction U. In the present exemplary embodiment shown in FIGS. 1A and 1B, the mounting portion 16 is rigid and cannot be taken apart.

However, embodiments in which the mounting portion 16 can be taken apart or folded (see FIG. 4) are also within the meaning of the invention.

The mounting state means a state in which the attachment 10 is fitted to the vehicle wheel 12, that is to say the state which the attachment 10 is in before it is finally fastened to the vehicle wheel 12, but in which mounting can begin. If the mounting portion 16 is in multi-part form, it is first assembled and is then in the form in which it is closed in the circumferential direction. After the mounting portion 16 has been assembled, mounting of the attachment 10 on the vehicle wheel 12 can begin. The mounting state thus means the state in which mounting on the vehicle wheel 12 can begin.

In the mounting state, as is shown in FIGS. 1A and 1B, the tread portion 18 has a gap 22 in the circumferential direction U. The attachment 10, or the tread portion 18 thereof, comprises an insert portion 24. The insert portion 24 is complementary in form to the gap 22.

In the exemplary embodiment of FIGS. 1A and 1B, the insert portion 24 is detachable from the tread portion 18 and can be screwed thereto for fastening. However, it is also conceivable to configure the insert portion 24 so that it is pivotably or displaceably connected to the tread portion 18, wherein such connections can be detachable or non-detachable.

As a result of the gap 22, it is possible to fasten the mounting portion 16 and the tread portion 18 to the vehicle wheel 12 without removing the vehicle wheel 12 from the vehicle or lifting the vehicle with a jack.

For mounting the attachment 10 on the vehicle wheel 12, the gap 22 is simply oriented towards the ground and the mounting portion is mounted on the vehicle wheel 12. This mounting operation will be discussed in greater detail hereinbelow.

In the exemplary embodiment of FIGS. 1A and 1B, the tread portion 18 is integrally formed with the mounting portion 16. The tread portion 18 and the mounting portion 16 are thus mounted on the vehicle wheel 12 at the same time.

In embodiments in which the tread portion 18 is detachable from the mounting portion 16 (see FIG. 3), the mounting portion 16 can be mounted on the vehicle wheel 12 first, and then the tread portion 18 can be fitted to the mounting portion 16. The tread portion 18 can be fitted in a simple manner to the mounting portion 16 already fastened to the vehicle wheel 12, because as a result of the gap 22 there is sufficient space relative to the ground.

When the mounting portion 16 and the tread portion 18 have been fastened to the vehicle wheel 12, the vehicle can be moved slightly. The gap 22 then moves, as a result of the rotation of the vehicle wheel 12, away from the orientation towards the ground. For example, the vehicle can be moved forwards by half a turn of the vehicle wheel 12, the gap 22 is then no longer oriented towards the ground but points upwards.

The insert portion 24 can then be inserted into or received in the gap 22. The attachment 10, or the tread portion 18 thereof, then has a closed circular running surface 26 in the circumferential direction U (see FIGS. 2A and 2B). Mounting of the attachment 10 is then complete and the vehicle is ready to drive.

Figure 2B:
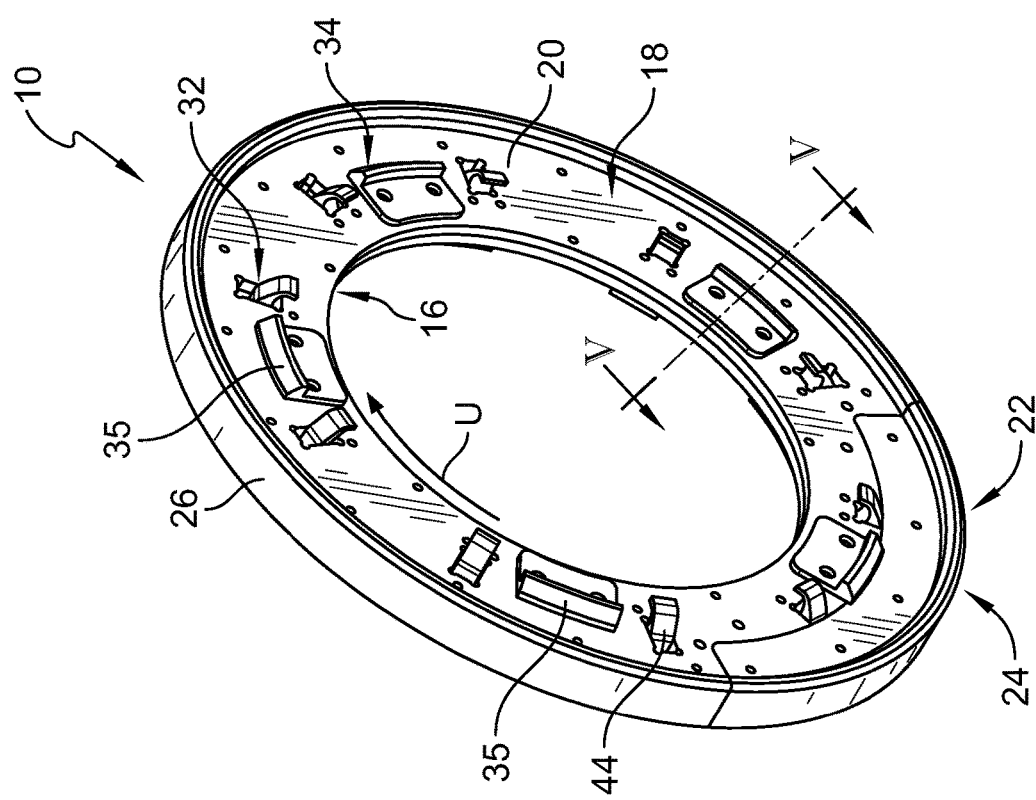
FIGS. 2A and 2B show the attachment of FIGS. 1A and 1B in the state in which it is finally fastened to the vehicle wheel, in perspective from two views.
Figure 2A:
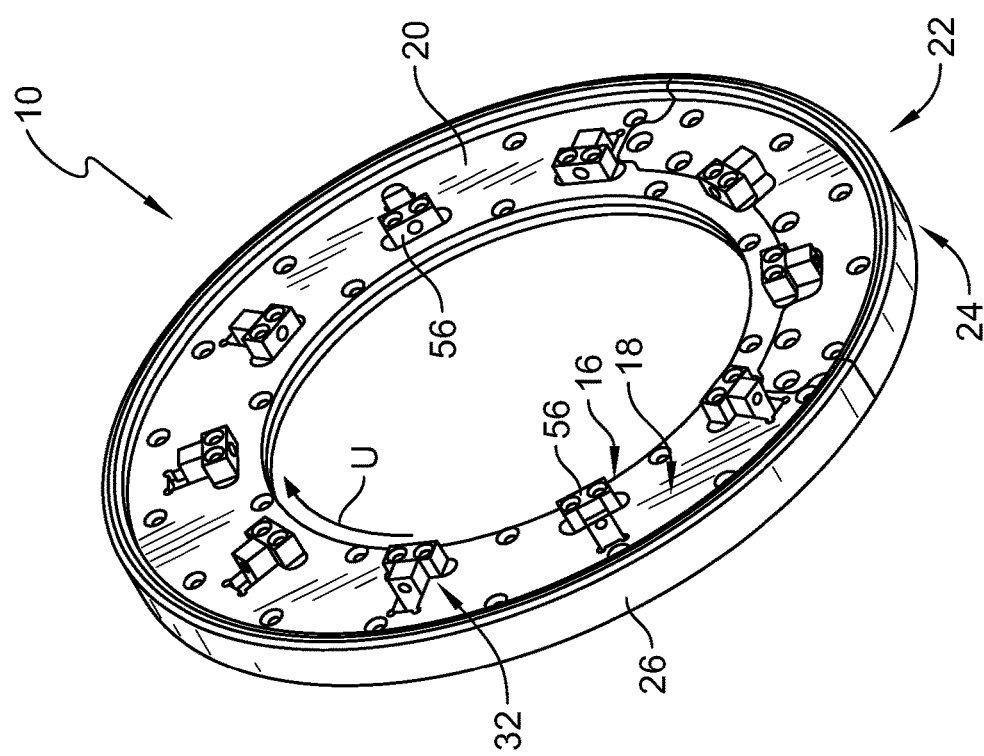

This state, in which the insert portion 24 has been inserted into the gap 22, is shown in FIGS. 2A and 2B. For the sake of clarity, the vehicle wheel 12 is not shown in FIGS. 2A and 2B.

The gap 22 advantageously extends at least over ⅛, preferably at least over ⅙, preferably, as shown in FIGS. 1A and 1B, at least over ¼, of the circumferential extent of the tread portion 18.

The gap advantageously extends over not more than half, preferably over not more than ⅓, of the circumferential extent of the tread portion 18.

Figure 3:
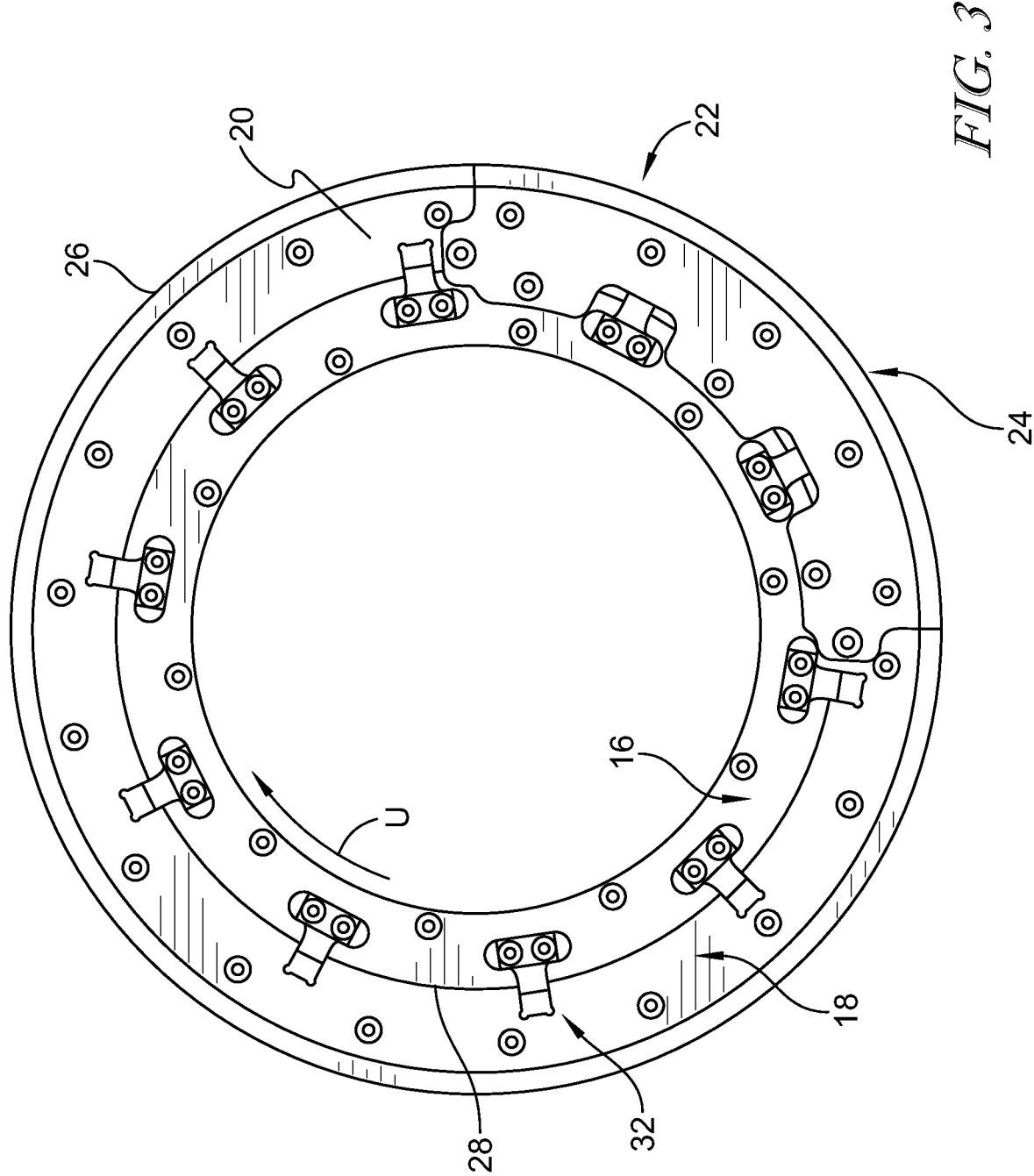
FIG. 3 shows a further embodiment of an attachment according to the invention.

FIG. 3 shows an embodiment in which the tread portion 18 is detachable from the mounting portion 16. The attachment 10 shown in FIG. 3 therefore has a parting line 28. The tread portion 18 and the mounting portion 16 can be fastened to one another, for example, via a screw, plug or hook connection.

Figure 4:
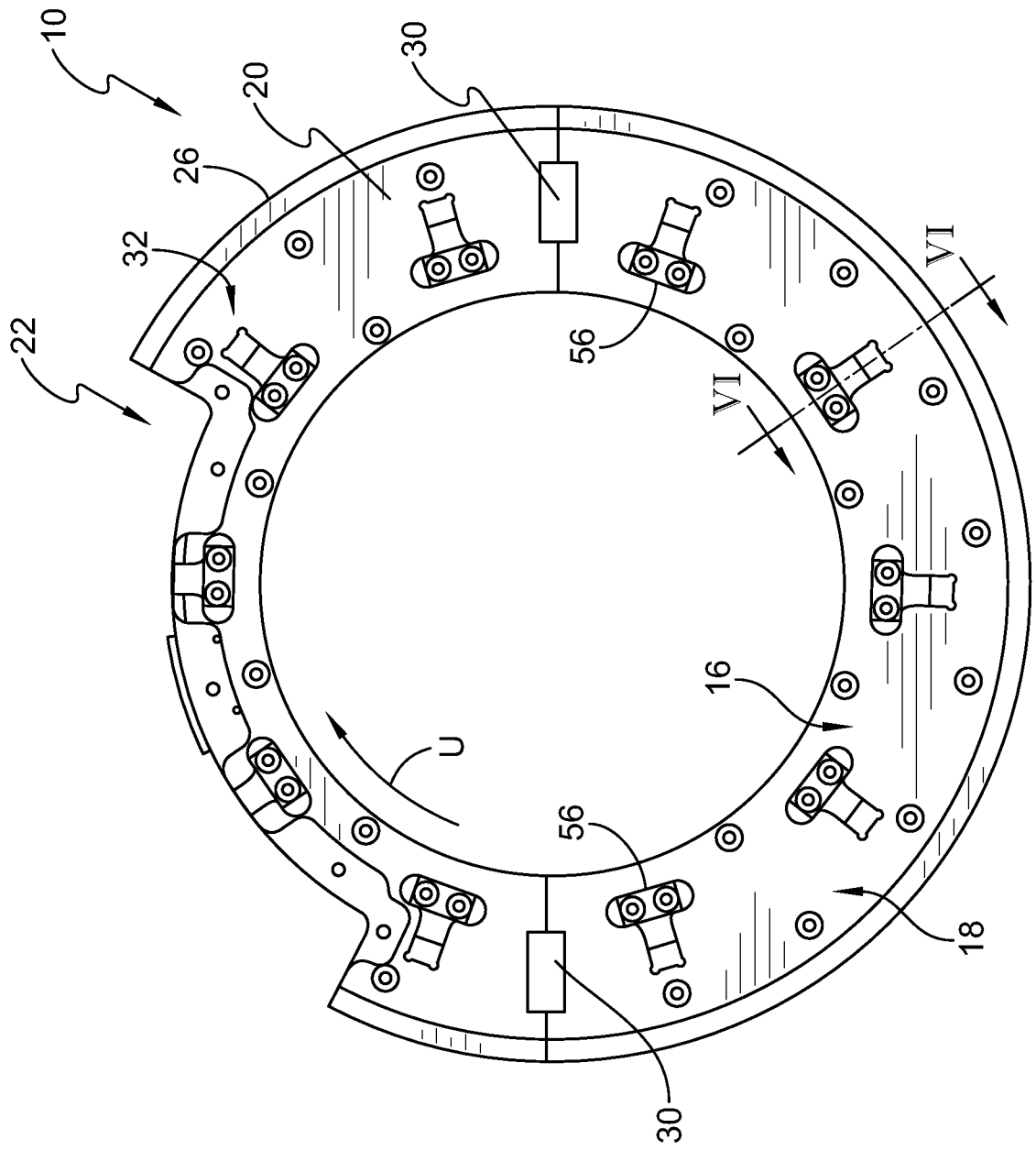
FIG. 4 shows a further embodiment of an attachment according to the invention without an insert portion.

FIG. 4 shows an embodiment in which the mounting portion 16, or the attachment 10, is foldable. To that end, the mounting portion 16 has two folding mechanisms 30.

The folding mechanisms 30 in FIG. 4 are additionally detachable, so that the mounting portion 16, or the attachment 10, can also be taken apart.

For fitting the attachment 10 to the vehicle wheel 12, the attachments shown in FIGS. 1A to 5 have on the one hand a fastening device 32 and on the other hand a positioning device 34. The fastening device 32 and the positioning device 34 are arranged on the mounting portion 16.

The positioning device 34 is advantageously so formed that it can be fitted to the rim flange 52 and centers the attachment 10 relative to the vehicle wheel 12. For example, the positioning device 34 can to that end comprise a plurality of spring-biased positioning elements 35.

The fastening device 32 can be actuated independently of the positioning device 34. The tread portion 18 and also the mounting portion 16 have a rim-side part 36 and a part 38 remote from the rim which is detachable from the rim-side part (see FIGS. 5, 6 and 7).

The rim-side part 36 and the part 38 remote from the rim of the tread portion 18 form in the assembled state a receiving portion 40 in which a tread body 42 is held by interlocking engagement.

It is preferred if the fastening device 32 comprises at least one fastening means 44, optionally a plurality of fastening means, which are preferably detachable.

It is also advantageous if the fastening device 32 comprises a coupling mechanism 46 (shown schematically in FIGS. 1A-1B) which couples a movement of at least two movable, preferably of all movable, fastening means 44 on actuation, preferably clamping, of the fastening device 32 in the radial direction R and/or in the axial direction A, preferably wherein the coupling mechanism 46 is so configured that the movement of the coupled movable fastening means 44 is uniform.

Such a coupling mechanism 46 can be formed, for example, by a toothed wheel connection of the individual fastening means 44. Or it can be formed in the manner of a clamping ring which, on actuation of the fastening device 32, pulls all the fastening means 44 uniformly inwards. Further forms of the coupling mechanism 46 are likewise possible within the meaning of the invention.

It is preferred if the fastening device 32, preferably at least one of the fastening means 44, preferably a plurality, in particular all, of the fastening means 44, comprise a hook portion 48 which is configured to engage behind a portion, in particular a rim flange 52, of the rim 13 of the vehicle wheel 12. This engagement is shown in detail in FIG. 6 and FIG. 7.

The fastening device 32 is preferably so configured that the mounting portion 16, on fastening and clamping to the rim 13 of the vehicle wheel 12, is urged in the axial direction A towards the rim 13.

Preferably, the fastening device 32 has a clamping surface 54 which, when seen in the axial direction A, slopes radially inwards, preferably in a linear or arcuate manner, wherein the fastening device 32 is so configured that the clamping surface 54 moves, in particular is displaced, radially inwards when the attachment 10 is fastened and clamped to the rim 13, and the clamping surface 54 is so configured that the mounting portion 16 is urged in the axial direction A towards the rim 13 when it is fastened and clamped to the rim 13 of the vehicle wheel 12.

Figure 5:
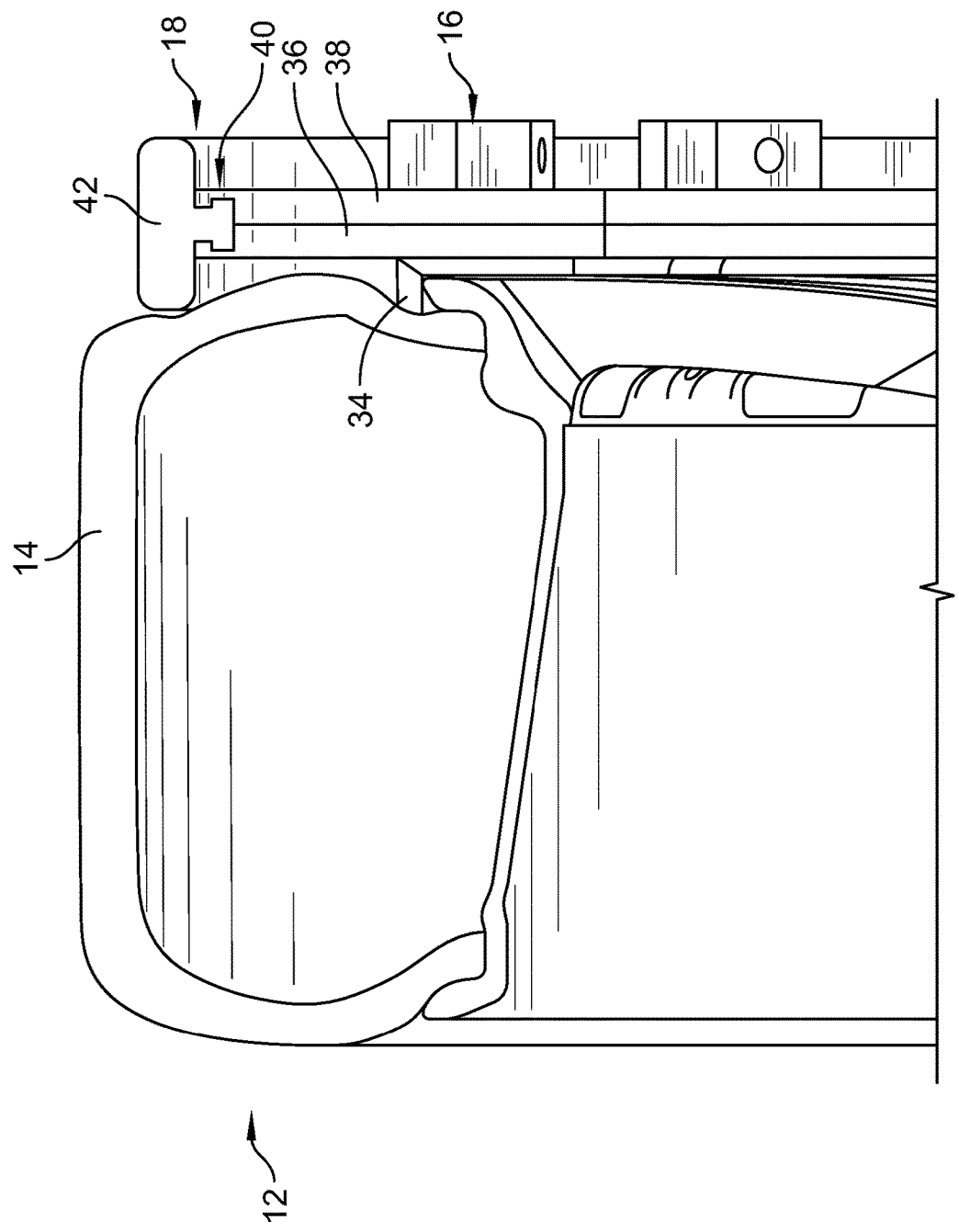
FIG. 5 is a detailed representation of a detail around a positioning device in the state positioned on the vehicle wheel.
Figure 6:
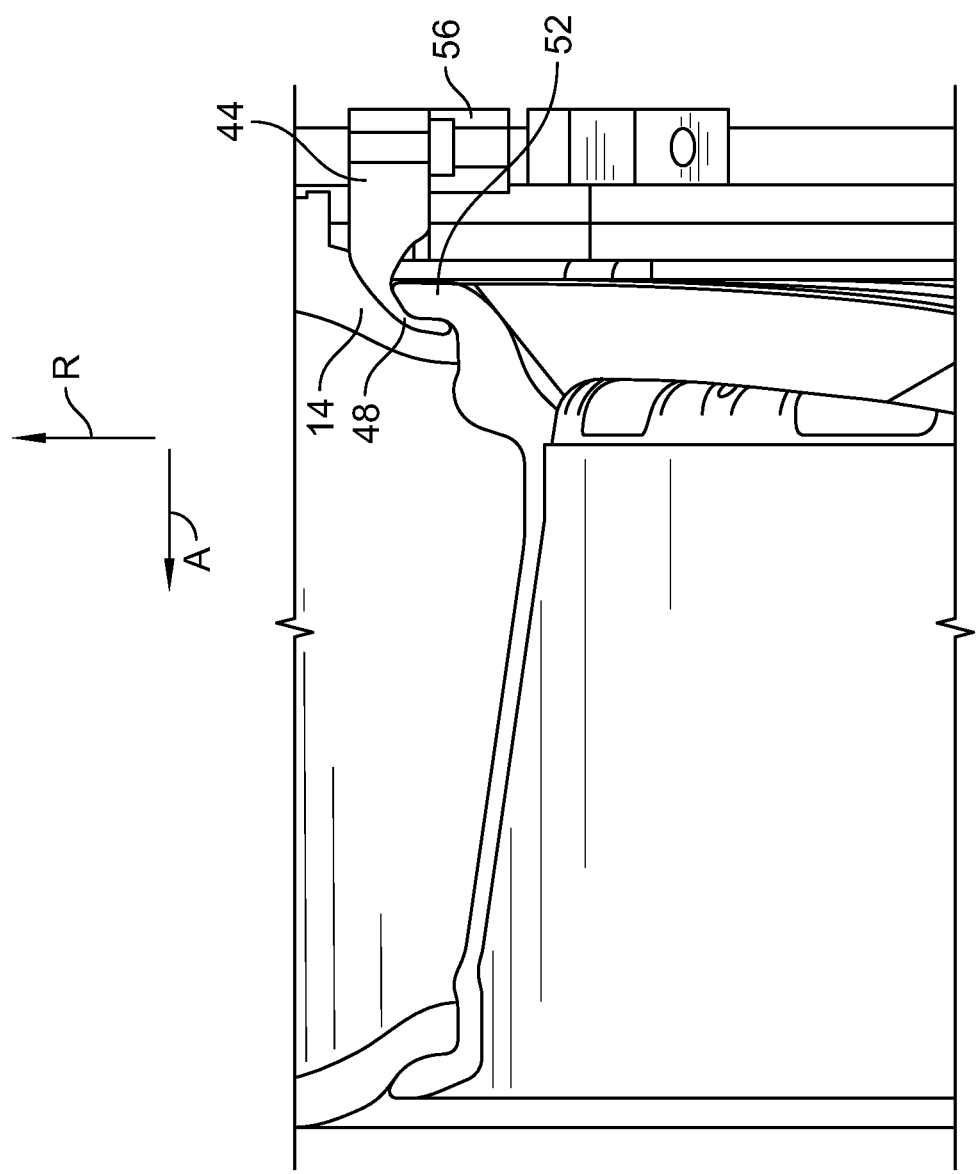
FIG. 6 is a detailed representation of a detail around a fastening device in the state fastened to the vehicle wheel.
Figure 7:
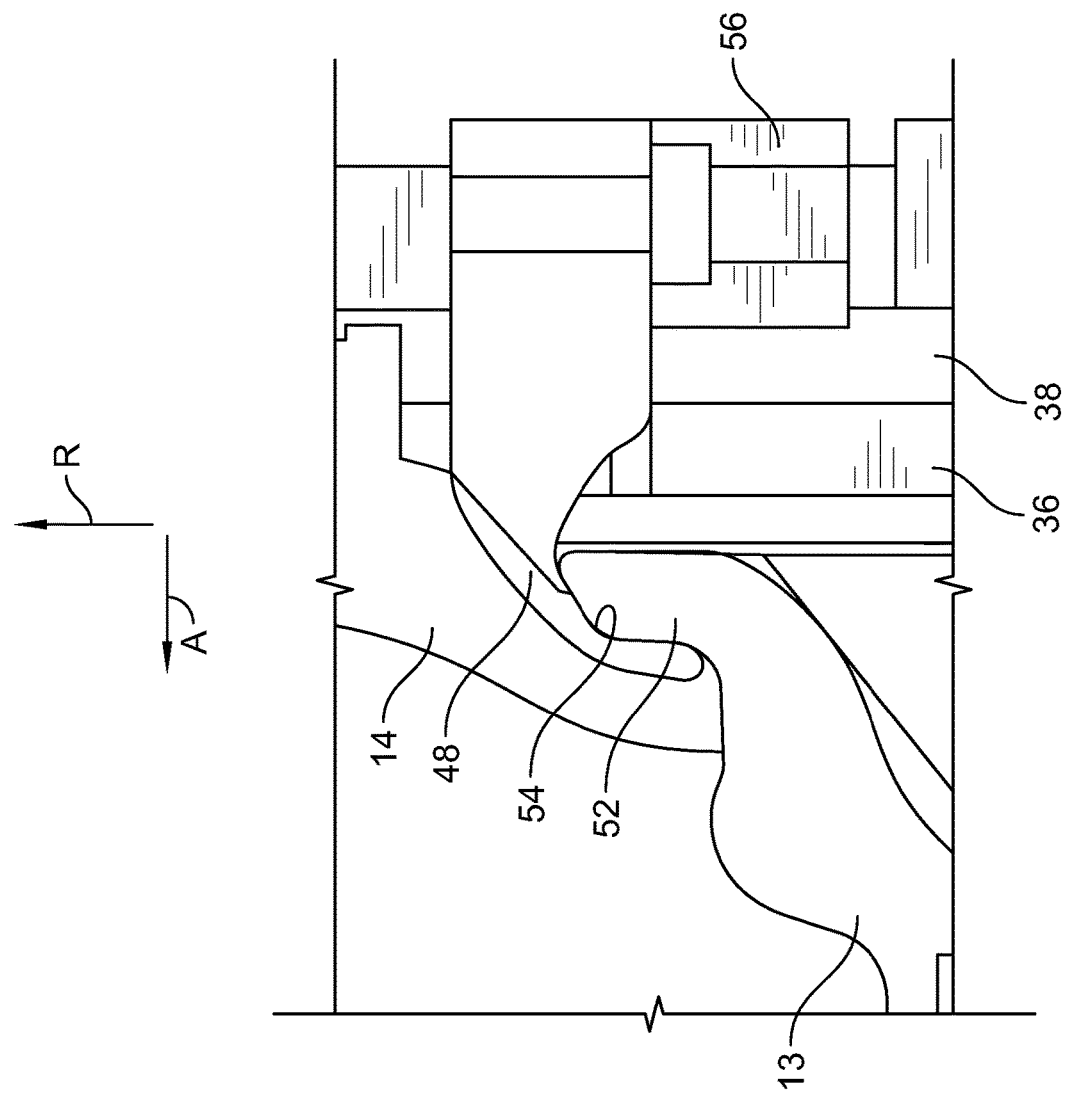
FIG. 7 shows a detail from FIG. 6.
Figure 8:
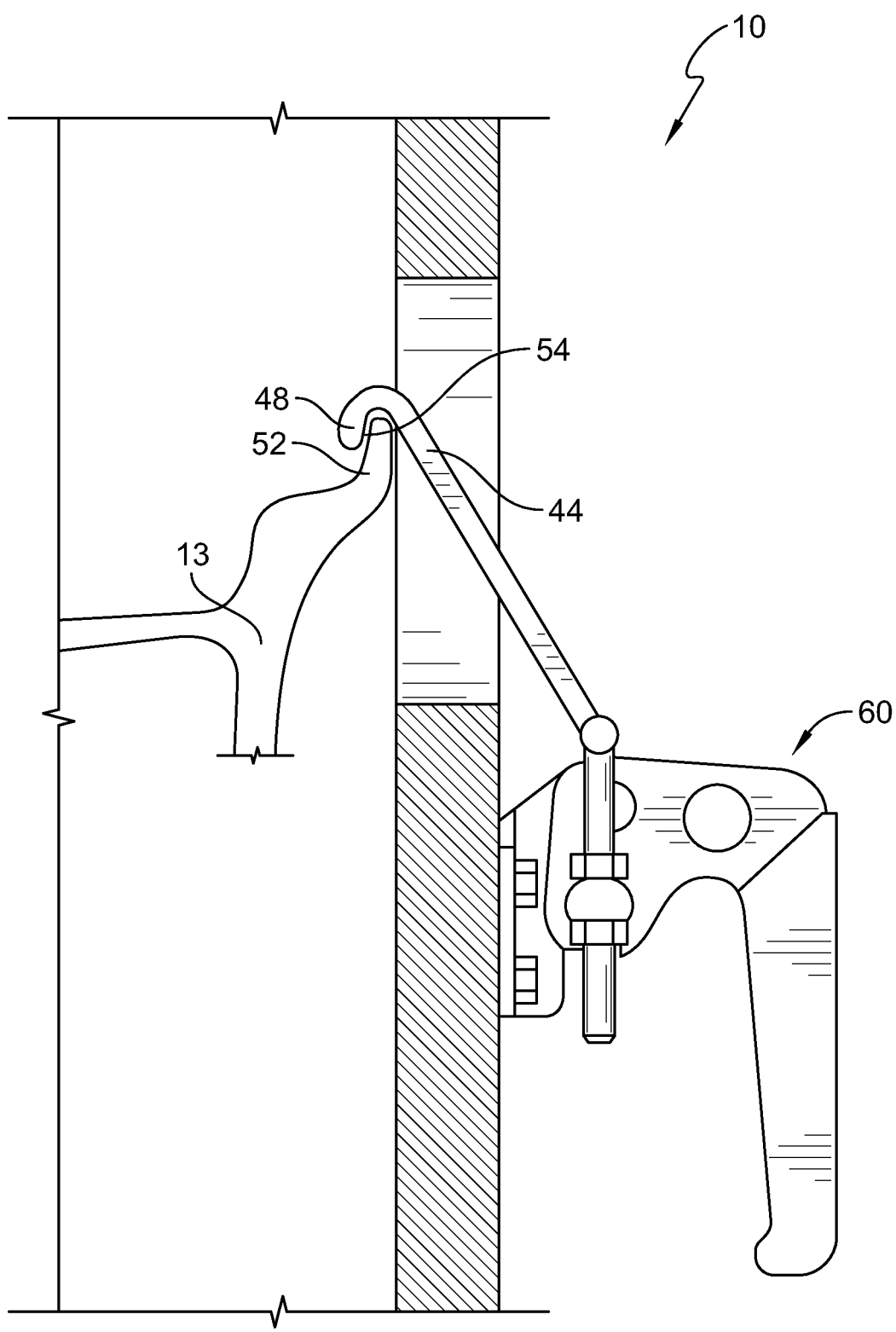
FIG. 8 shows an alternative fastening device.

FIGS. 5, 6 and 7 each show a part-region of the attachment, as is fastened to the vehicle wheel 12. FIG. 5 shows a section along line V-V from FIGS. 2A and 2B. It can therefore be seen in FIG. 5 how the positioning device 34 rests on the rim flange 52.

FIG. 6 shows a representation corresponding to FIG. 5, but a section along line VI-VI from FIG. 4 is shown. In FIG. 6 and also FIG. 7, which shows an enlarged part-region of FIG. 6, the functioning of the fastening device 32 can readily be seen.

In the embodiment of the fastening device shown in FIGS. 1A to 7, fastening means 44 are in each case in the form of hook-like elements which are movably fastened to holding lugs 56 by a screw connection.

For actuating the fastening device 32, the fastening means 44 are so actuated that they move radially inwards. In so doing, they engage behind the rim flange 52 with their hook portions 48. Actuation can be effected, for example, by tightening a clamping screw.

Alternatively, a fastening device 32 is also conceivable which has fastening means 44 which are movable via a lever mechanism 60, which can preferably be locked, wherein they advantageously also comprise a hook portion 48 which is configured to engage behind the rim flange 52.

Figure 9C:
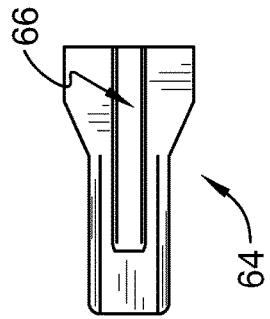
FIGS. 9A-9C show shows a further embodiment of an attachment according to the invention.
Figure 9A:
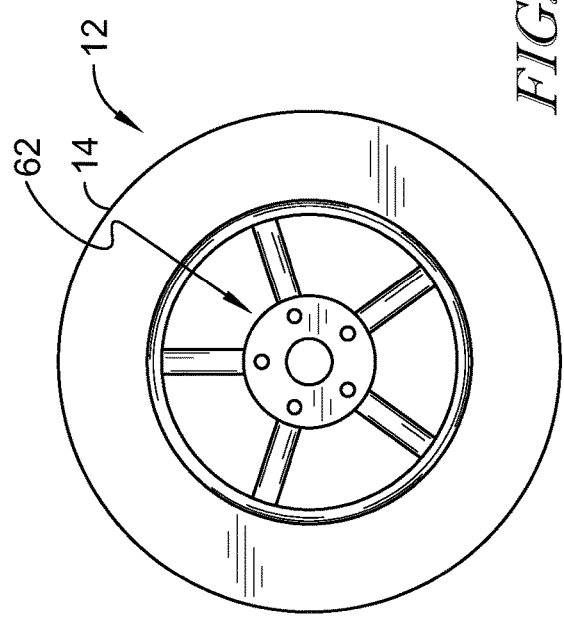
Figure 9B:
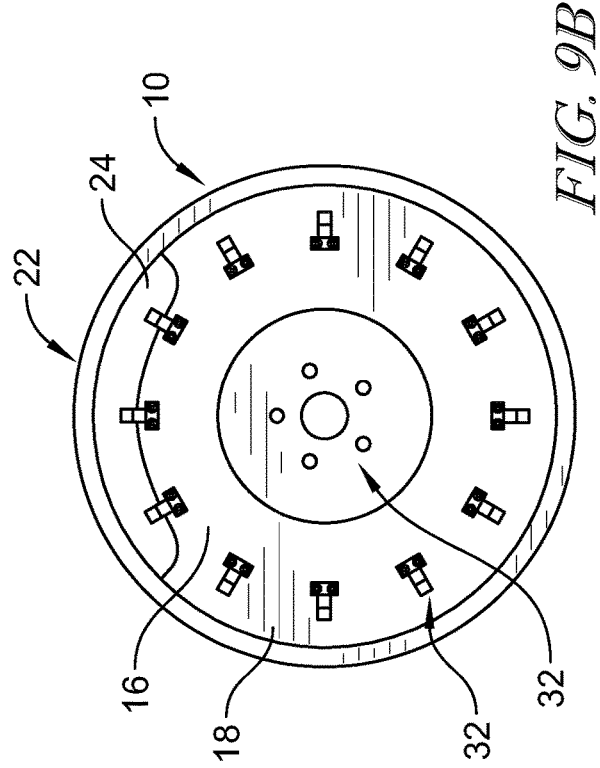

The fastening device 32 can also be so configured that the attachment 10 can be fastened in the region of the bolt circle 62 of the original wheel. For example, the original screws of the vehicle wheel 12 can to that end be replaced by screws 64 having an internal thread 66, so that the attachment 10 can be screwed into that internal thread 66, or the original screws of the vehicle wheel 12 can be replaced by special screws via which both the attachment 10 and the original wheel can be fastened. Such an embodiment is illustrated in FIGS. 9A-9C, wherein the attachment 10 is shown in the state removed from the vehicle wheel 12. Attachment via the screws 64 having an internal thread 66 in the region of the bolt circle 62 represents an additional fastening device 32 in FIG. 9C, but it may also be the only fastening device 32 of the attachment.

In vehicle wheels having a center lock, this can be removed and replaced by a suitable fastening instrument, for example a threaded sleeve. The attachment 10 can then be fastened in this threaded sleeve.

Figure 10:
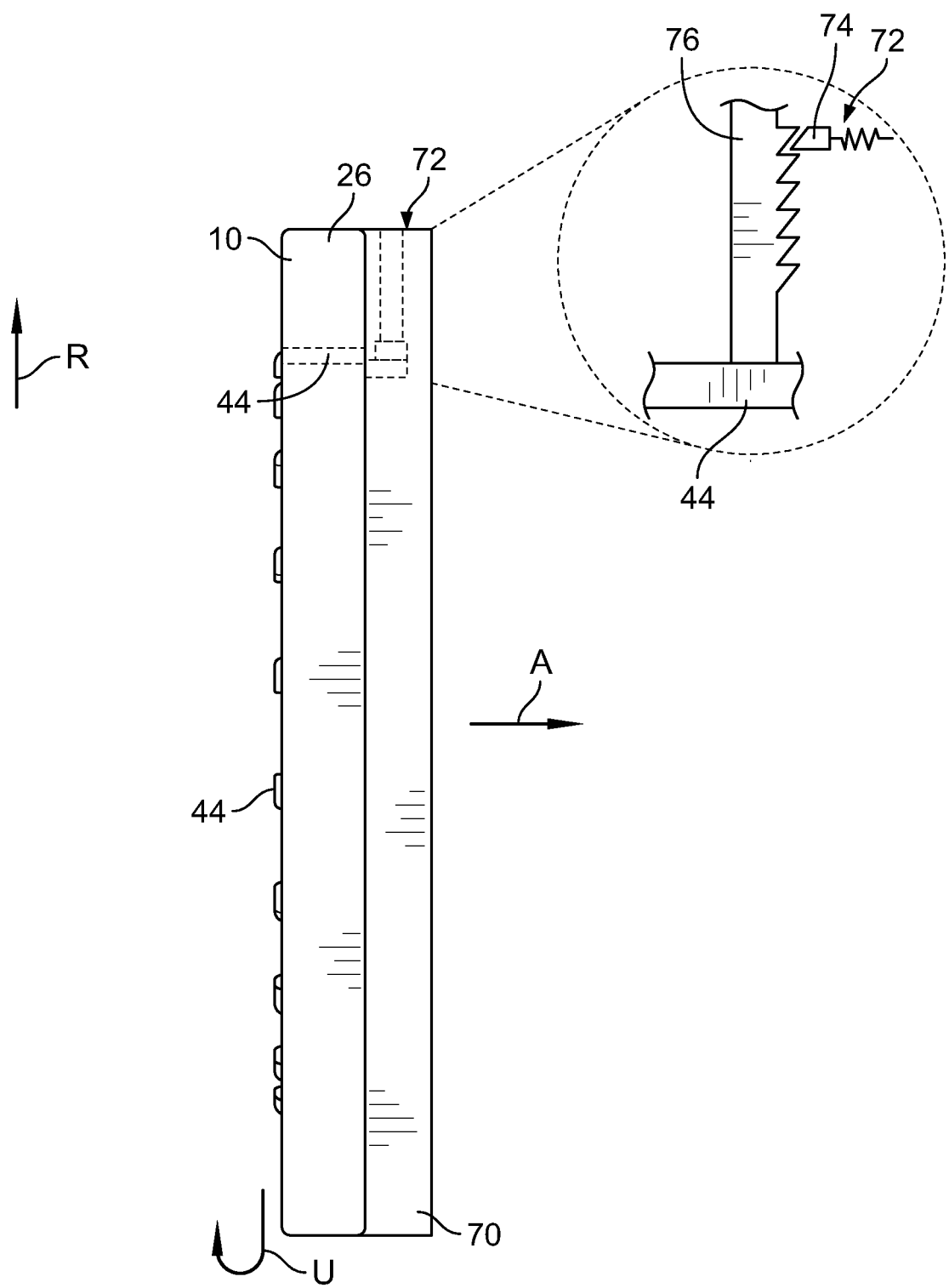
FIG. 10 shows a further embodiment of an attachment according to the invention with a clamping attachment.

As is shown in FIG. 10, also within the meaning of the present invention is an attachment 10 for a vehicle wheel 12 for allowing vehicle operation with limited tire function, having a base body 20 and a fastening device 32 for fastening the attachment 10 to the rim 13 of the vehicle wheel 12, wherein the base body 20, when seen in an axial direction A, is circular or largely annular in shape, wherein the attachment 10 comprises a clamping attachment 70 for the fastening device 32 which is configured to be fastened to the attachment 10 radially externally around the fastening device 32 and, in the fastened state, to contact the driving surface in such a manner that a catch mechanism 72 of the clamping attachment 70 is so clamped that it exerts pressure on the fastening device 32 radially inwards.

To that end, the clamping attachment 70 has a catch mechanism 72 which permits clamping radially inwards but prevents that clamping from being loosened radially outwards.

To that end, the catch mechanism 72 can have a spring-biased engagement element 74 which is able to engage into a pressing element 76 having corresponding recesses. This engagement takes place in such a manner that the pressing element 76 is freely movable radially inwards. The engagement element 74 can be withdrawn by means of a corresponding loosening tool, so that the pressing element 76 can also be moved radially outwards and the attachment 10 can be removed from the vehicle wheel 12.

The invention claimed is:

1. An attachment for a vehicle wheel which allows the vehicle to be driven with a flat tire, the attachment comprising:
   a base body including a mounting portion and a tread portion, wherein the mounting portion is configured to be closed in a circumferential direction in a mounting state of the attachment in which the attachment is mounted on the vehicle wheel,
   wherein the tread portion is formed with a gap in the circumferential direction in the mounting state,
   and the tread portion further comprises an insert portion which, when the attachment is in the mounting state is, received in the gap in such a manner that the tread portion has a closed circular running surface,
   and wherein the mounting portion is configured to be taken apart or folded.

2. The attachment as claimed in claim 1, wherein the insert portion is at least one of detachable from the tread portion and pivotably or displaceably connected to the tread portion.

3. The attachment as claimed in claim 1, wherein the gap extends at least over ⅛ of the circumferential extent of the tread portion.

4. The attachment as claimed in claim 1, wherein the gap extends over not more than half of the circumferential extent of the tread portion.

5. The attachment as claimed in claim 1, wherein the tread portion is integrally formed with the mounting portion.

6. The attachment as claimed in claim 1, wherein the tread portion is detachable from the mounting portion.

7. The attachment as claimed in claim 1, wherein the mounting portion is rigid and cannot be taken apart.

8. The attachment as claimed in claim 1, wherein the mounting portion has a positioning device for positioning the attachment on a rim of the vehicle wheel.

9. The attachment as claimed in claim 8, wherein the mounting portion has a fastening device for fastening the attachment to the rim of the vehicle wheel.

10. The attachment as claimed in claim 9, wherein the fastening device is configured to be actuated independently of the positioning device.

11. The attachment as claimed in claim 1, wherein at least one of the tread portion and the mounting portion has a rim-side part and another part that is remote from the rim and detachable from the rim-side part, wherein the rim-side part and the another part form in an assembled state thereof a receiving portion in which a tread body is held in an interlocking manner.

12. The attachment as claimed in claim 9, wherein the fastening device comprises at least one detachable fastening member.

13. The attachment as claimed in claim 9, wherein the fastening device comprises a coupling mechanism which couples a movement of at least two movable fastening members on actuation of the fastening device in at least one of a radial direction and an axial direction, wherein the coupling mechanism is so configured that the movement of the coupled at least two fastening members is uniform.

14. The attachment as claimed in claim 13, wherein at least one of the at least two fastening members comprises a hook portion configured to engage behind a portion of the rim of the vehicle wheel.

15. The attachment as claimed in claim 9, wherein the fastening device is so configured that, when the mounting portion has been fastened to the vehicle wheel the mounting portion contacts the rim over at least a sixth of a circumference of the vehicle wheel.

16. The attachment as claimed in claim 9, wherein the fastening device is so configured that the mounting portion, on fastening and clamping to the rim of the vehicle wheel, is urged in an axial direction towards the rim.

17. The attachment as claimed in claim 9, wherein the fastening device comprises a clamping surface which, when seen in an axial direction, slopes radially inwards, wherein the fastening device is so configured that the clamping surface, on fastening and clamping of the attachment to the rim, moves radially inwards, and the clamping surface is so configured that the mounting portion, on fastening and clamping to the rim of the vehicle wheel, is urged in the axial direction towards the rim.

18. The attachment as claimed in claim 9, wherein the fastening device has at least one fastening member movable by a lever mechanism, wherein the at least one fastening member comprises a hook portion configured to engage behind a rim flange of the rim.

* * * * *